United States Patent
Horiuchi

(10) Patent No.: US 9,579,833 B2
(45) Date of Patent: *Feb. 28, 2017

(54) METHOD AND APPARATUS FOR FORMING THREE-DIMENSIONAL IMAGE

(71) Applicant: CASIO COMPUTER CO., LTD., Tokyo (JP)

(72) Inventor: Yuji Horiuchi, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 608 days.

This patent is subject to a terminal disclaimer.

(21) Appl. No.: 13/711,112

(22) Filed: Dec. 11, 2012

(65) Prior Publication Data

US 2013/0161874 A1    Jun. 27, 2013

(30) Foreign Application Priority Data

Dec. 26, 2011  (JP) ................................ 2011-282836

(51) Int. Cl.
| | |
|---|---|
| B29C 44/34 | (2006.01) |
| B29C 44/02 | (2006.01) |
| B29C 44/04 | (2006.01) |

(52) U.S. Cl.
CPC ........ B29C 44/3415 (2013.01); B29C 44/022 (2013.01); B29C 44/0461 (2013.01)

(58) Field of Classification Search
CPC .............. B29C 44/022; B29C 44/3415; B29C 44/0461

(Continued)

(56) References Cited

U.S. PATENT DOCUMENTS

| | | | |
|---|---|---|---|
| 4,871,408 A | 10/1989 | Honma et al. | |
| 4,874,407 A | 10/1989 | Lefkowitz | |

(Continued)

FOREIGN PATENT DOCUMENTS

| | | |
|---|---|---|
| JP | 64-028660 A | 1/1989 |
| JP | 09193368 A | 7/1997 |

(Continued)

OTHER PUBLICATIONS

Japanese Office Action dated Apr. 23, 2014, 2014 in counterpart Japanese Application No. 2011-287276.

(Continued)

*Primary Examiner* — Nahida Sultana
(74) *Attorney, Agent, or Firm* — Holtz, Holtz & Volek PC

(57) ABSTRACT

There are provided a method and apparatus for forming a three-dimensional image. The method and apparatus form an arbitrary colored image on the surface of a thermally expandable sheet by using surface image data. The method and apparatus form a mirror image, of which the density of a black component is adjusted in consideration of the influence of the density of the colored image on a bulge height of a thermally expandable layer so that an originally scheduled bulge height can be achieved, on the back of the thermally expandable sheet. The method and apparatus can achieve an intended bulge height by expanding the thermally expandable layer with thermal energy that is generated in the mirror image and the colored image when the thermally expandable sheet is irradiated with light including infrared wavelengths from the back of the thermally expandable sheet.

13 Claims, 12 Drawing Sheets

(58) Field of Classification Search
USPC ..... 264/40.6, 413, 494, 482, 493; 425/174.4
See application file for complete search history.

(56) References Cited

U.S. PATENT DOCUMENTS

| | | | |
|---|---|---|---|
| 5,122,430 A | 6/1992 | Nishitsuji et al. | |
| 2006/0249884 A1* | 11/2006 | Partanen et al. | 264/401 |
| 2007/0158877 A1* | 7/2007 | Rajner | B22F 3/1125 |
| | | | 264/415 |
| 2010/0231443 A1* | 9/2010 | Whitehead | 342/357.23 |
| 2012/0218338 A1* | 8/2012 | Kanamura et al. | 347/15 |
| 2013/0161874 A1 | 6/2013 | Horiuchi | |
| 2013/0168903 A1* | 7/2013 | Horiuchi et al. | 264/413 |
| 2014/0110887 A1* | 4/2014 | Horiuchi | 264/413 |
| 2015/0070452 A1* | 3/2015 | Motoyanagi | B41J 11/002 |
| | | | 347/102 |
| 2015/0097308 A1* | 4/2015 | Batchelder et al. | 264/40.6 |

FOREIGN PATENT DOCUMENTS

| | | | | |
|---|---|---|---|---|
| JP | 2001-150812 A | 6/2001 | | |
| JP | 2002513697 A | 5/2002 | | |
| JP | 2007331257 A | 12/2007 | | |
| JP | 2001150812 | * 6/2011 | | B41M 5/26 |

OTHER PUBLICATIONS

Related U.S. Appl. No. 13/716,580 ; First Named Inventor: Yuji Horiuchi; Title: "Method and Apparatus for Forming Three-Dimensional Image"; Filed: Dec. 17, 2012.

* cited by examiner

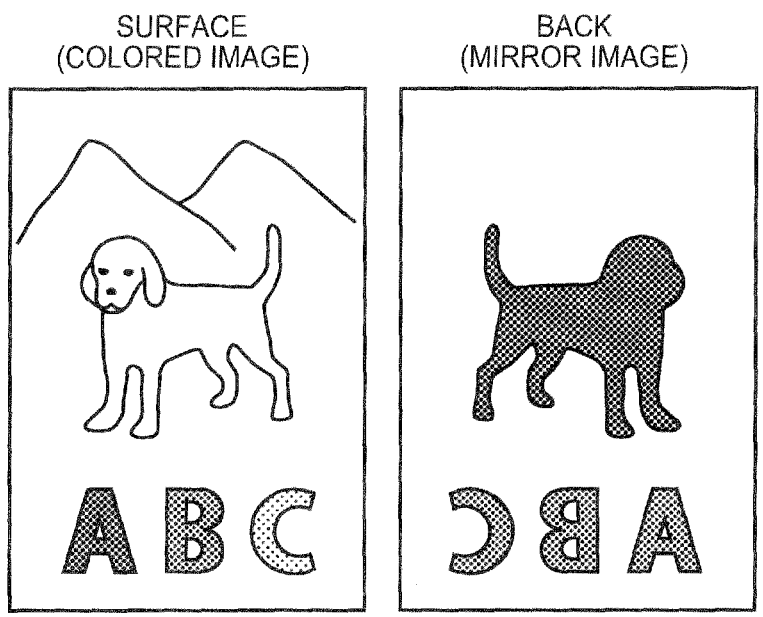

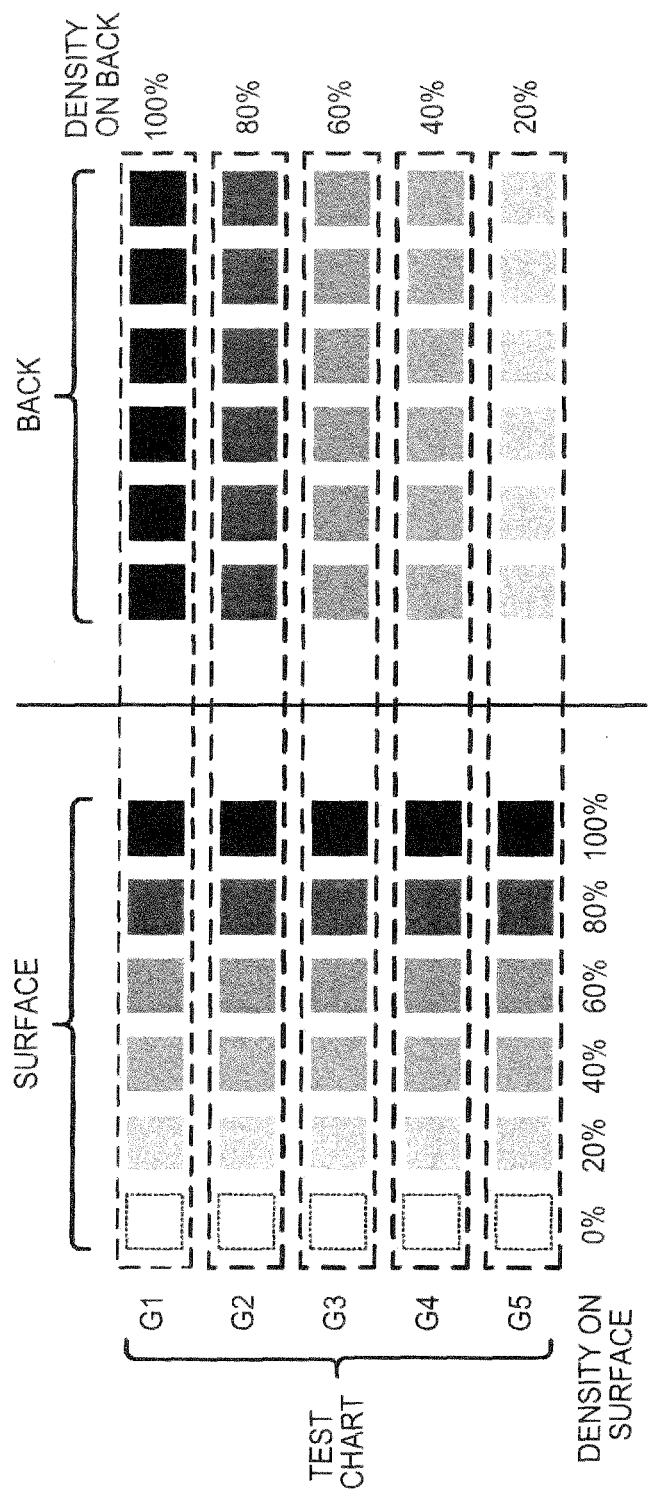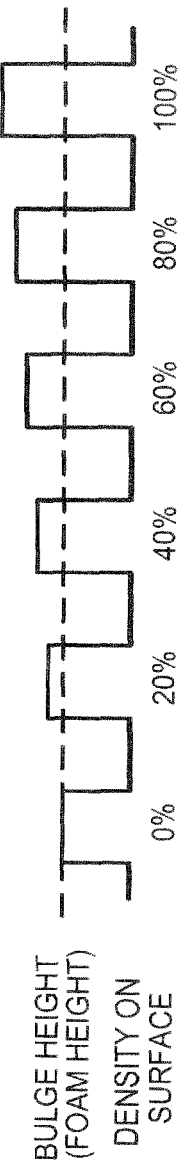

DETAILS OF PORTION IX

METHOD AND APPARATUS FOR FORMING THREE-DIMENSIONAL IMAGE

CROSS-REFERENCE TO RELATED APPLICATION

This application claims priority based on Japanese Patent Application No. 2011-282836, filed on Dec. 26, 2011, the entire contents of which are incorporated by reference herein.

BACKGROUND OF THE INVENTION

Field

The present invention relates to a method and apparatus for forming a three-dimensional image, and more particularly, to a method and apparatus for forming a three-dimensional image by selectively expanding a thermally expandable sheet.

Background

A thermally expandable sheet (or a thermally foamable sheet) where a thermally expandable layer (or a foamable layer) containing foamable microcapsules expanding due to heating is formed on one surface of a base sheet has been known in the past. When the thermally expandable sheet is irradiated with light including infrared light after an image pattern having a high light absorption property is printed on this thermally expandable sheet, the region of the thermally expandable layer corresponding to the image pattern is selectively heated and expanded. Accordingly, it is possible to form a three-dimensional image, which corresponds to the image pattern, on one surface of the base sheet.

As the technique for forming a three-dimensional image, for example, JP-A-64-28660 discloses a method including forming a print image using black toner or ink having a high light absorption property on the surface of a thermally expandable sheet that corresponds to a thermally expandable layer, or on the back of the thermally expandable sheet that corresponds to a base sheet; and forming a three-dimensional image by heating and expanding (foaming) the microcapsules of the region of the thermally expandable layer corresponding to the print image by irradiating the thermally expandable sheet with light from a halogen lamp or the like so that light is absorbed in the print image and heat is generated.

Further, for example, JP-A-2001-150812 discloses a method including forming a color image or the like on the surface of the thermally expandable sheet that corresponds to a thermally expandable layer; forming a light absorption pattern, which is formed of a grayscale image so as to correspond to the pattern of the color image formed on the surface, on the back of the thermally expandable sheet that corresponds to a base sheet; generating heat corresponding to the grayscale of the light absorption pattern by irradiating the thermally expandable sheet with light from the back of the thermally expandable sheet; and controlling the degree of the expansion of the thermally expandable layer to adjust the bulge height of a three-dimensional image.

According to the method disclosed in JP-A-2001-150812, it is possible to form a three-dimensional image of which an arbitrary portion is controlled to have an arbitrary bulge height (foam height) according to the pattern of the color image or the like that is formed on the surface of the thermally expandable sheet corresponding to the thermally expandable layer.

However, according to the result of the inventor's verification of these methods of forming a three-dimensional image, it is found that the bulge height of the three-dimensional image is affected by the grayscale of the color image or the like formed on the surface of the thermally expandable sheet corresponding to the thermally expandable layer in addition to the grayscale of the light absorption pattern formed on the back of the thermally expandable sheet corresponding to the base sheet. For this reason, when the density of the light absorption pattern formed on the back is set so as to correspond to the pattern or the like of the color image formed on the surface of the thermally expandable sheet and the irradiation of light is performed, the three-dimensional image exceeds an intended bulge height in some grayscales of the color image or the like. Accordingly, there is a problem in that a good three-dimensional image may not be formed. Meanwhile, the problem in the related art will also be described in detail in the detailed description to be described below.

SUMMARY

The invention has been made in consideration of the above-mentioned circumstances, and an object of the invention is to provide a method and apparatus for forming a three-dimensional image that can achieve an intended bulge height in consideration of the influence of the grayscale of a print image formed on the surface of a thermally expandable sheet when the thermally expandable sheet is irradiated with light to form a three-dimensional image.

In order to achieve the above-mentioned object of the invention, according to an aspect of the invention, there is provided a method of forming a three-dimensional image including: forming a first print image on one surface of a thermally expandable sheet where a thermally expandable layer is formed on the one surface of a base sheet; forming a second print image on a region of the other surface of the thermally expandable sheet, the second print image being to be a mirror image of the first print image, the region of the other surface corresponding to the first print image of the one surface, and a density of a photothermal conversion material contained in the second print image being set based on a density of a photothermal conversion material contained in the first print image; and forming a three-dimensional image of the first print image by selectively expanding the thermally expandable layer with thermal energy that is generated in the second print image when irradiating the thermally expandable sheet with light from the other surface of the thermally expandable sheet.

Further, in order to achieve the above-mentioned object of the invention, according to another aspect of the invention, there is provided an apparatus for forming a three-dimensional image including: a print function unit and an image processing unit. The print function unit forms a first print image on one surface of a thermally expandable sheet where a thermally expandable layer is formed on the one surface of a base sheet and forms a second print image on a region of the other surface of the thermally expandable sheet with a photothermal conversion material. The second print image is to be a mirror image of the first print image. The region of the other surface corresponds to the first print image of the one surface. The image processing unit sets a density of the photothermal conversion material contained in the second print image based on a density of a photothermal conversion material contained in the first print image. A three-dimensional image of the first print image is formed by selectively expanding the thermally expandable layer with thermal energy that is generated according to at least the density of the photothermal conversion material contained in the second print image when the thermally expandable sheet is irradiated with light from the other surface of the thermally expandable sheet.

According to the method and apparatus for forming a three-dimensional image of the aspect of the invention, it is possible to achieve an intended bulge height in consideration of the influence of the grayscale of a print image formed on the surface of a thermally expandable sheet when the thermally expandable sheet is irradiated with light to form a three-dimensional image.

BRIEF DESCRIPTION OF THE DRAWINGS

A more complete understanding of this application can be obtained when the following detailed description is considered in conjunction with the following drawings, in which:

FIGS. 2A, 2B, and 2C are schematic plan views illustrating a method of forming a three-dimensional image according to a comparative example;

FIGS. 4A and 4B are views illustrating an analytical method of the method of forming a three-dimensional image according to the comparative example;

DETAILED DESCRIPTION

A method and apparatus for forming a three-dimensional image according to the invention will be described in detail below with reference to embodiments.

<Method of Forming Three-Dimensional Image>

First, a method of forming a three-dimensional image according to the invention will be described.

Figure 1:
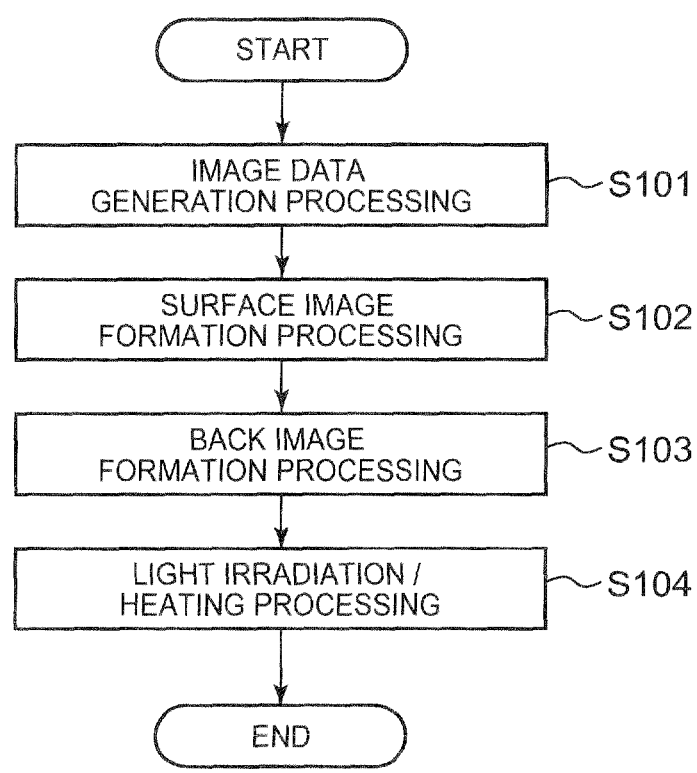
FIG. 1 is a flow chart illustrating an example of a method of forming a three-dimensional image according to the invention.

FIG. 1 is a flow chart illustrating an example of a method of forming a three-dimensional image according to the invention.

As shown in FIG. 1, the method of forming a three-dimensional image according to an embodiment substantially includes image data generation processing (S101), surface image formation processing (S102), back image formation processing (S103), and light irradiation/heating processing (S104).

In the image data generation processing (S101), the image data of an arbitrary colored image that is to be a target of a three-dimensional image (hereinafter, referred to as "surface image data") and a thermally expandable sheet on which a three-dimensional image of the colored image to be formed are prepared first. Here, the thermally expandable sheet is a sheet where a thermally expandable layer (foamable layer) containing foamable microcapsules is formed on one surface of a base sheet as described above. Further, the colored image may be a color image and may be a monochrome image or a monotone image.

After that, the density data of a black component, which is set in a specific region or pixels such as a pattern of the colored image, is extracted on the basis of the surface image data. Further, the bulge height (foam height) data of the thermally expandable layer, which are scheduled in the specific region or the like when the thermally expandable sheet is heated to form a three-dimensional image, are extracted. Furthermore, image data where the density of a black component of a specific portion, which corresponds to the specific region or the like, of a mirror image, which is an inverted image of the colored image, are set (hereinafter, referred to as "back image data") are generated on the basis of the density data and the bulge height data by a data processing method to be described below. Meanwhile, in this specification, a black component is not limited to black as a color and means a photothermal conversion material that generates thermal energy by absorbing light including infrared wavelengths. For example, carbon black is applied as such a photothermal conversion material.

In the image data generation processing (S101), a data processing method of setting the density of a black component of the specific portion of the mirror image is performed conceptually as follows. That is, when light irradiation/heating processing to be described below is performed, the bulge height of the thermally expandable layer of the thermally expandable sheet depends on the density of a black component of a mirror image that is formed on the back of the base sheet of the thermally expandable sheet. In addition to this, the bulge height of the thermally expandable layer is also affected by the density of a black component that is included in a colored image formed on the surface of the thermally expandable sheet corresponding to the thermally expandable layer. Accordingly, in this embodiment, the density of a black component of the mirror image formed on the back (the surface corresponding to the base sheet) of the thermally expandable sheet is adjusted in anticipation of (in consideration of) the influence of a black component, which is included in the colored image formed on the surface (the surface corresponding to the thermally expandable layer) of the thermally expandable sheet, on the bulge height of the thermally expandable layer so that the originally scheduled bulge height can be achieved. Meanwhile, this data processing method will be described in detail in the verification of an effect to be described below.

Then, in the surface image formation processing (S102), an arbitrary colored image is formed (printed) using the prepared surface image data on the surface of the thermally expandable sheet. Here, various printers, such as an inkjet printer, a laser printer, and a thermal transfer printer, mentioned in an apparatus for forming a three-dimensional image to be described below can be applied to form the colored image on the surface of the thermally expandable sheet.

After that, in the back image formation processing (S103), a black mirror image, which is set to a predetermined density, is formed (printed) using the back image data, which are generated by the data processing method, on the back of the thermally expandable sheet so as to correspond to the position of the colored image formed on the surface of the thermally expandable sheet. Here, various printers, such as an inkjet printer, a laser printer, and a thermal transfer printer, mentioned in an apparatus for forming a three-dimensional image to be described below can also be applied to form the mirror image on the back of the thermally expandable sheet.

Then, in the light irradiation/heating processing (S104), the thermally expandable sheet where the colored image is formed on the surface and the mirror image is formed on the back as described above is uniformly irradiated with light, which includes infrared wavelengths, from the back of the thermally expandable sheet by a light source, such as a halogen lamp or an infrared lamp. Accordingly, the density of a black component is adjusted on the basis of the density of a black component contained in the colored image formed on the surface of the thermally expandable sheet, so that thermal energy is generated in the mirror image formed on the back of the thermally expandable sheet through the absorption of the irradiation light. As a result, the region of the thermally expandable layer corresponding to the mirror image is heated. Further, at this time, thermal energy is also generated in the region of the colored image, which corresponds to the mirror image, according to the density of a contained black component. As a result, the region of the thermally expandable layer corresponding to the colored image is further heated.

The microcapsules of the corresponding region of the thermally expandable layer expand (foam) due to the thermal energy that is generated in the mirror image formed on the back of the thermally expandable sheet and the colored image formed on the surface of the thermally expandable sheet as described above. Accordingly, the thermally expandable layer bulges to a scheduled (that is, a preset predetermined) height, so that an intended three-dimensional image is formed.

Next, the data processing method of the above-mentioned method of forming a three-dimensional image and the effect thereof will be specifically verified with reference to a comparative example. Here, a case where a three-dimensional image is formed by expanding a thermally expandable layer, which is formed on the surface of a thermally expandable sheet where an intended colored image is formed on the surface, to a uniform and intended bulge height will be described to make the gist of the invention concise.

After a method of forming a three-dimensional image according to a comparative example will be described first and the problems of the method according to the comparative example are verified, the characteristics and effects of the method of forming a three-dimensional image according to this embodiment will be described.

Figure 2C:
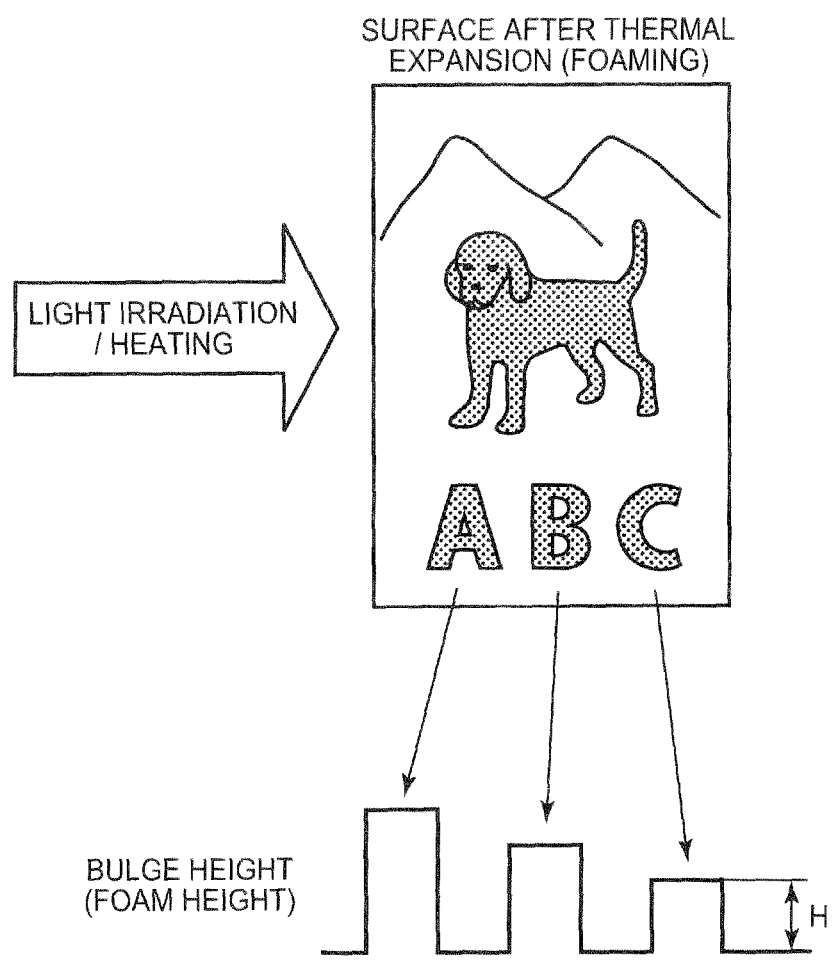

FIGS. 2A, 2B, and 2C are schematic plan views illustrating a method of forming a three-dimensional image according to a comparative example, and FIGS. 3A, 3B, 3C, and 31) are schematic cross-sectional views illustrating the method of forming a three-dimensional image according to the comparative example.

For example, a three-dimensional image where an image of a dog and letters of "A", "B", and "C" printed on the surface of a thermally expandable sheet bulge to a uniform height as shown in FIG. 2 is formed in the method of forming a three-dimensional image according to the comparative example of the invention. In this case, first, as shown in FIG. 2A, the image of the dog and the letters are formed (printed) with arbitrary colors on the surface of the thermally expandable sheet. Then, mirror images, which are inverted images of the image of the dog and the letters formed on the surface of the thermally expandable sheet, are formed as shown in FIG. 2B and these mirror images are formed (printed) with inks or toners containing black components, which are set to the same density, on the back of the thermally expandable sheet. After that, the thermally expandable sheet is uniformly irradiated with light, which has a predetermined intensity, from the back of the thermally expandable sheet, so that thermal energy is generated according to the densities of the black component of the mirror images. As a result, the regions of the thermally expandable layer corresponding to the mirror images are heated and expanded as shown in FIG. 2C.

Here, when the bulge height of the thermally expandable layer, which expands due to the selective heating of the thermally expandable layer caused by the light irradiation of the thermally expandable sheet, depends on only the densities of the black component of the mirror images formed on the back of the thermally expandable sheet, it is expected that the bulge height become uniform if the black components of the mirror images are set to the same density as shown in FIG. 2B. However, even though the black components of the mirror images are set to the same density, there is a case where the bulge heights of "A", "B", and "C" are not uniform and exceed an originally scheduled bulge height H as shown in FIG. 2C.

According to the verification of a variation in the bulge height that is performed by the inventor, the bulge height of the surface of the thermally expandable sheet depends on not only the density of the black component of the mirror image formed on the back of the thermally expandable sheet but also the density of the black component contained in the colored image formed on the surface of the thermally expandable sheet. For this reason, it is found out that a variation occurs in the bulge height.

Figure 3A:
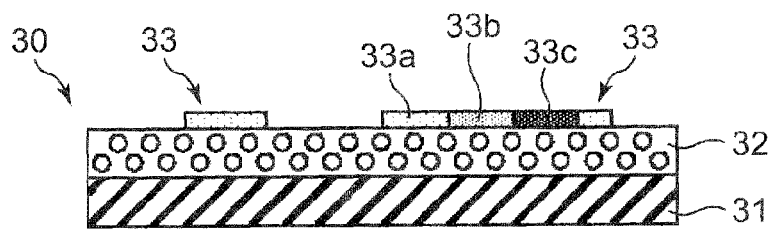
FIGS. 3A, 3B, 3C, and 3D are schematic cross-sectional views illustrating the method of forming a three-dimensional image according to the comparative example.

In more detail, as shown in FIG. 3A, arbitrary colored images 33 are formed on the surface, which corresponds to a thermally expandable layer 32, of a thermally expandable sheet 30 where the thermally expandable layer 32 is coated and formed on one surface of a base sheet 31 (the upper surface in FIG. 3A) as in the case shown in FIG. 2A. Here, the colored image 33 is not limited to a case where a colored image is formed with a single color and set to the same density (see a colored image 33 shown on the left side in FIG. 3A), and may be a colored image where regions 33a to 33c having arbitrary densities according to patterns or the like are set on the basis of surface image data (see a colored image 33 shown on the right side in FIG. 3A).

Figure 3B:
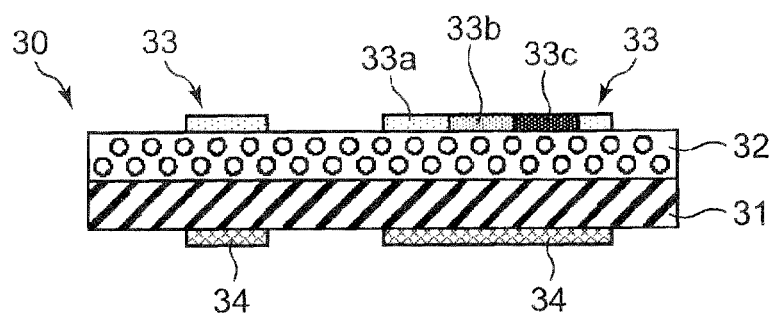

Meanwhile, as shown in FIG. 3B, mirror images 34 of the colored images 33 are formed on the back of the thermally expandable sheet 30, which corresponds to the base sheet 31, so as to correspond to the colored images 33 formed on the surface of the thermally expandable sheet 30. Here, the densities of the mirror images 34 are set on the basis of only a bulge height scheduled on the surface of the thermally expandable sheet 30. That is, as in the case shown in FIG. 2B, the mirror images 34 are formed so as to have the same density regardless of the densities of the colored images 33.

Figure 3C:
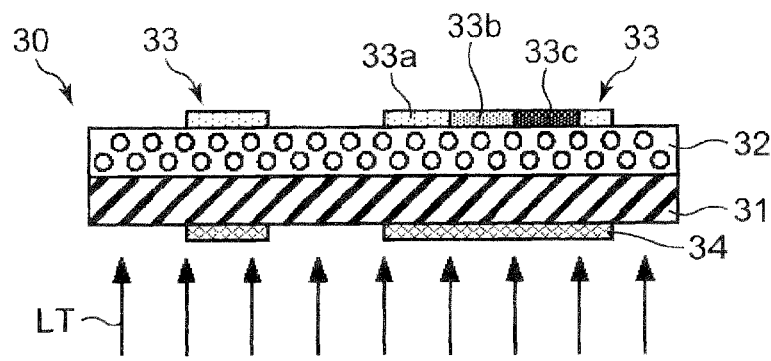
Figure 3D:
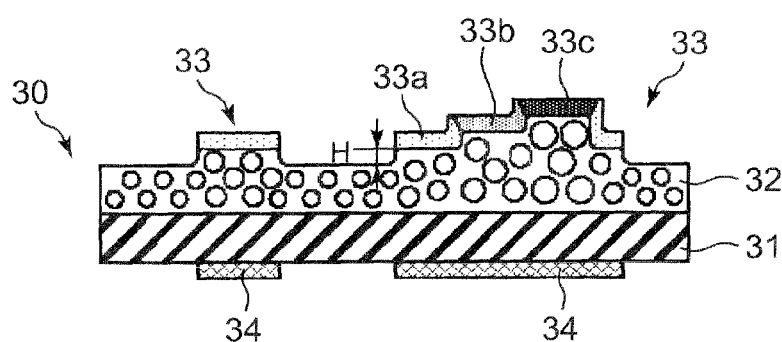

Further, as shown in FIG. 3C, the thermally expandable sheet 30 is uniformly irradiated with light LT, which includes infrared wavelengths and has a predetermined intensity, from the back on which the mirror images 34 are formed, so that thermal energy is generated in the mirror images 34. As a result, the regions of the thermally expandable layer 32 corresponding to the mirror images 34 are expanded (foamed). At this time, not only the thermal energy, which is generated in the mirror images 34 formed on the back of the thermally expandable sheet 30, but also the thermal energy, which is generated in the colored images 33 formed on the surface of the thermally expandable sheet 30 due to the irradiation of the light LT, is transferred to the regions of the thermally expandable layer 32 on which the colored images 33 are formed. Here, since the amount of the thermal energy, which is generated and transferred from the colored images 33, varies according to the densities of the black component (that is, a material having a high photo-thermal conversion property such as carbon black) contained in the respective regions 33a to 33c corresponding to the patterns or the like, a difference occurs in the expansion of the microcapsules of the thermally expandable layer 32 as shown in FIG. 3D and a variation occurs in the bulge height of the thermally expandable layer 32 as in the case shown in FIG. 2C. For this reason, there is a problem in that an intended bulge height H is not obtained.

Furthermore, the inventor has analyzed the tendency of the influence of the densities of the colored images, which are formed on the surface of the thermally expandable sheet, on the bulge height of the thermally expandable layer in detail by further performing verification.

Figure 5:
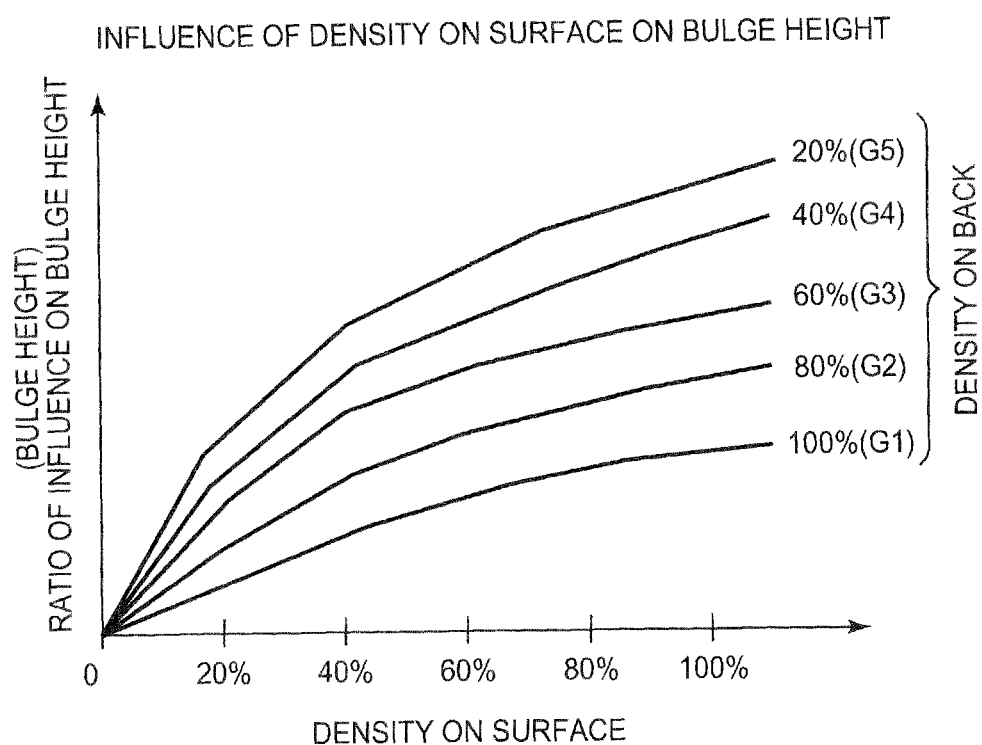
FIG. 5 is a view illustrating, the concept of a data processing method of a method of forming a three-dimensional image according to an embodiment of the invention (the results of the analysis of the comparative example)

FIGS. 4A and 4B are views illustrating an analytical method of the method of forming a three-dimensional image according to the comparative example, and FIG. 5 is a view illustrating the concept of a data processing method of a method of forming a three-dimensional image according to this embodiment (the results of the analysis of the comparative example).

That is, as shown in FIG. 4A, test charts, of which the densities of the black component are set to 0%, 20%, 40%, 60%, 80%, and 100% so as to vary, are formed on the surface of the thermally expandable sheet (see the left side in FIG. 4A), and a test chart set to a specific density (any one of 0%, 20%, 40%, 60%, 80%, and 100%) is formed on the back of the thermally expandable sheet so as to correspond to each of the test charts (see the right side in FIG. 4A). Here, as surrounded in FIG. 4A by a dotted line, each of the combinations of the test charts that are formed on the surface of the thermally expandable sheet and have different densities, and the test charts that are formed on the back of the thermally expandable sheet and have specific densities is referred to as a group. In FIG. 4A, a case where the density on the back is 100% is defined as a group G1, a case where the density on the back is 80% is defined as a group G2, a case where the density on the back is 60% is defined as a group G3, a case where the density on the back is 40% is defined as a group G4, and a case where the density on the back is 20% is defined as a group G5. A bulge height, when each of the groups is irradiated with light, is analyzed. Meanwhile, ink containing carbon black, which has a high photothermal conversion property, is used to form the test charts that are formed on the surface and the back of the thermally expandable sheet.

It has been found that the bulge height of the thermally expandable layer is affected by the density on the surface and tends to increase substantially in proportion to the density on the surface in any group as shown in FIG. 4B when the thermally expandable sheet where the test charts having the predetermined densities are formed on the surface and the back is heated by the irradiation of light performed from the back as described above.

Here, in the groups G1 to G3 that have a relatively high density on the back of 60 to 100%, the bulge height of the thermally expandable layer is greatly affected by the density on the back rather than the density on the surface. Further, in the groups G4 and G5 that have a relatively low density on the back of 20 to 40%, the bulge height of the thermally expandable layer is greatly affected by the density on the surface rather than the density on the back. Furthermore, when the density of the back is lower than the density on the surface, generally, the bulge height of the thermally expandable layer is greatly affected by the density on the surface in any group. The results of analysis shown in FIG. 5 are obtained about the degree of the influence (a ratio of the relative influence) of the density on the surface on the bulge height of the thermally expandable layer.

In the method of forming a three-dimensional image according to the invention, the density of the black component of the mirror image formed on the back is adjusted on the basis of the content of verification and the results of analysis shown in FIGS. 4 and 5 in anticipation of (in consideration of) the influence of the density on the surface so that the originally scheduled bulge height can be achieved even when the bulge height of the thermally expandable layer is affected by the density of the black component contained in the colored image formed on the surface of the thermally expandable sheet.

Specifically, when the bulge height of the thermally expandable layer is increased by, for example, 20% as compared to the scheduled bulge height due to the influence of the density of the black component contained in a specific region of the colored image, the density of the black component of a specific portion of the mirror image corresponding to the region is set so that the bulge height is reduced by 20%.

Figures 6A, 6B:
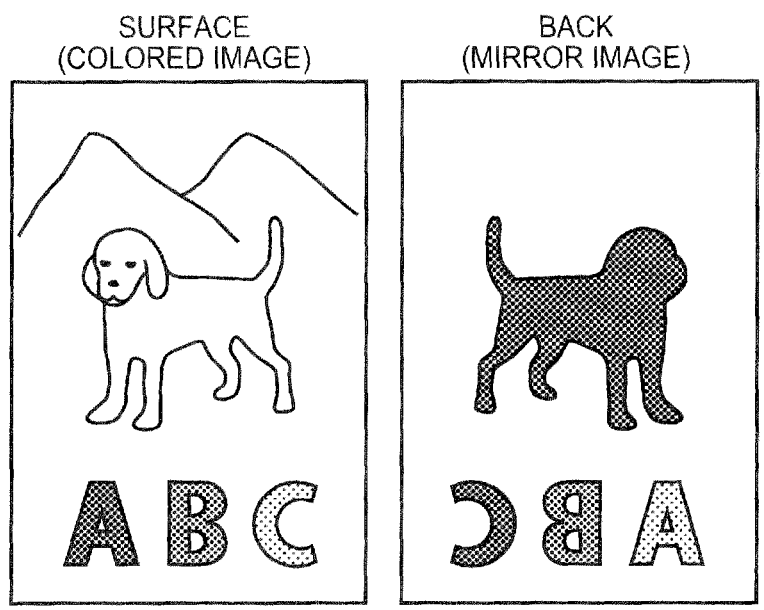
FIGS. 6A, 6B, and 6C are schematic plan views showing a specific example of the method of forming a three-dimensional image according to the embodiment of the invention.
Figure 6C:
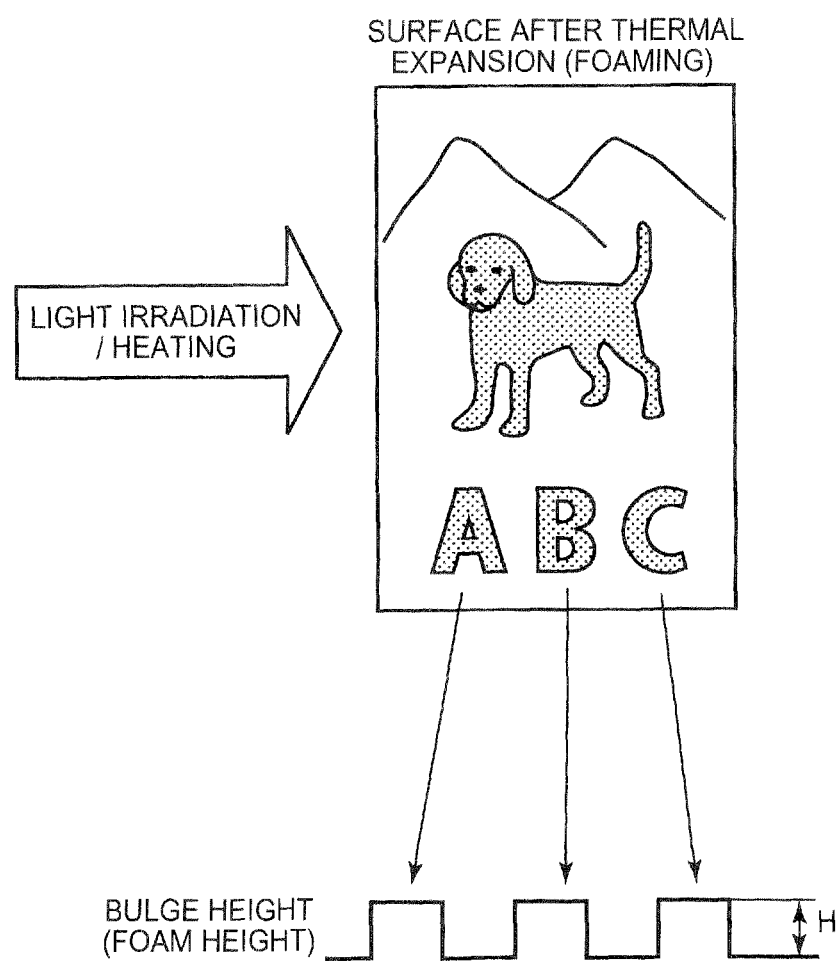

FIGS. 6A, 6B, and 6C are schematic plan views showing a specific example of the method of forming a three-dimensional image according to this embodiment, and FIGS. 7A, 7B, 7C, and 7D are schematic cross-sectional views showing a specific example of the method of forming a three-dimensional image according to this embodiment. Here, the same elements as those of the above-mentioned comparative example (see FIGS. 2 and 3) are denoted by the same reference numerals when being described.

A data processing method, which adjusts and sets the density of a black component of a mirror image formed on the back of a thermally expandable sheet on the basis of the same content of verification and the same results of analysis as described above, is performed in the method of forming a three-dimensional image according to the invention. That is, when a three-dimensional image where an image of a dog and letters of "A", "B", and "C" printed on the surface of a thermally expandable sheet bulge to a uniform height is formed as in the above-mentioned comparative example, the image of a dog and the letters are formed (printed) first with arbitrary colors on the surface of the thermally expandable sheet on the basis of surface image data as shown in FIG. 6A.

Then, as shown in FIG. 6B, mirror images, which are a print image of the dog of the surface and inverted print images of the letters, are formed on the back of the thermally expandable sheet on the basis of the surface image data. Further, the density data of the black components, which are contained in the print image of the dog of the surface and the letters, are extracted and the bulge height (foam height) data of the thermally expandable layer, which are scheduled in the print image of the dog and the letters, are extracted. Furthermore, the densities of the black components of the mirror images formed on the back are set on the basis of the density data, the bulge height data, the above-mentioned content of verification, and the above-mentioned results of analysis on that a scheduled bulge height is achieved in anticipation of (in consideration of) the influence of the densities of the print image of the dog of the surface and the letters on the bulge height of the thermally expandable layer.

That is, when the bulge height of the thermally expandable layer is affected by the density on the surface, a ratio of the change of the bulge height from the scheduled bulge height is calculated and the density of the black component of the back is adjusted according to the ratio. Specifically, for example, when the bulge height of the thermally expandable layer is increased due to the density on the surface, a rate of increase in the bulge height is calculated and the density on the back is set to a low level according to the rate of increase in the bulge height so that the rate of increase in the bulge height is substantially cancelled (offset). Alternatively, adjustment for increasing or reducing the density on the back is performed in consideration of the rate of increase in the bulge height. Mirror images are formed (printed) on the back of the thermally expandable sheet on the basis of the back image data where density is set in this way.

After that, the thermally expandable sheet is uniformly irradiated with light, which has a predetermined intensity, from the back of the thermally expandable sheet, so that the corresponding regions of the thermally expandable layer are heated and expanded as shown in FIG. 6C by the thermal energy generated according to the densities of the mirror images formed on the back and the thermal energy generated according to the densities of the print image of the dog of the surface and the letters. At this time, since the density on the back is set on the basis of the density on the surface by the above-mentioned data processing method, the total amount of heat that is transferred to the thermally expandable layer from the surface and the back of the thermally expandable sheet is set to the amount of heat that allows the thermally expandable layer to expand to a scheduled bulge height.

Accordingly, it is possible to form a good three-dimensional image where the thermally expandable layer expands to a uniform and scheduled intended bulge height H in any of the patterns of the print image of the dog and the letters as shown in FIG. 6C.

Further, in the method of forming a three-dimensional image according to the invention, as shown in FIGS. 7A, 7B, 7C, and 7D, colored images 33 formed on the surface of the thermally expandable sheet 30 are not limited to a case where the colored images are formed with a single color, and it is possible to expand the thermally expandable layer to a uniform and intended bulge height H even when regions having arbitrary different densities are set according to patterns or the like.

That is, as shown in 7A, arbitrary colored images 33 are formed on the surface of the thermally expandable sheet 30 as in the case shown in FIG. 6A. Here, in the colored image 33, regions 33a to 33c having arbitrary different densities according to patterns or the like are set on the basis of the surface image data (see a colored image 33 shown on the right side in FIG. 7A).

Figure 7A:
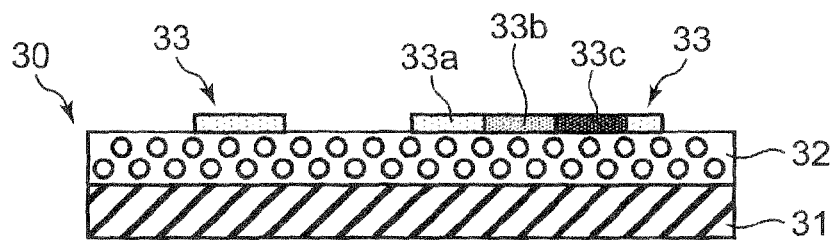
FIGS. 7A, 7B, 7C, and 7D are schematic cross-sectional views showing a specific example of the method of forming a three-dimensional image according to the embodiment of the invention.
Figure 7B:
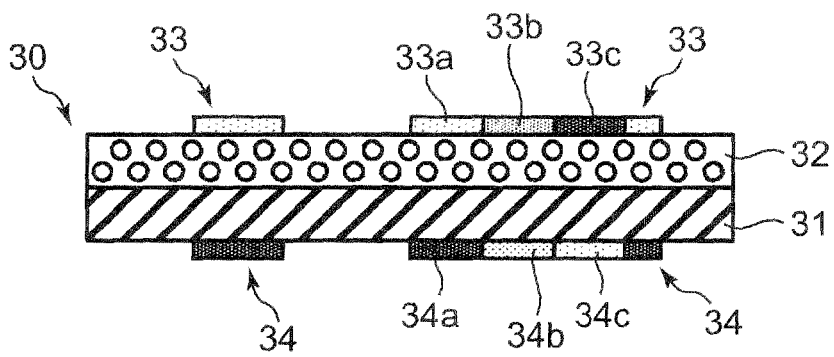

Furthermore, as shown in FIG. 7B, a mirror image 34, which includes specific portions 34a to 34c of which the densities are set by the above-mentioned data processing method, are formed on the back of the thermally expandable sheet 30 so as to correspond to the respective regions 33a to 33c that are set in the colored image 33 formed on the surface. Here, The densities of the respective specific portions 34a to 34c of the mirror image 34 are set on the basis of the densities of the respective regions 33a to 33c of the colored image 33 formed on the surface, a bulge height scheduled on a portion of a thermally expandable layer 32 corresponding to the respective regions 33a to 33c, the above-mentioned content of verification, and the above-mentioned results of analysis so that an originally scheduled bulge height is achieved in anticipation of the influence of the densities of the respective regions 33a to 33c of the colored image 33, which is formed on the surface, on the bulge height of the thermally expandable layer.

Figure 7C:
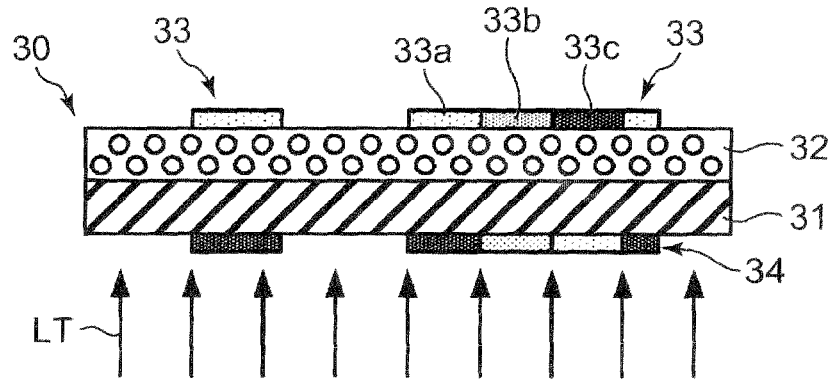
Figure 7D:
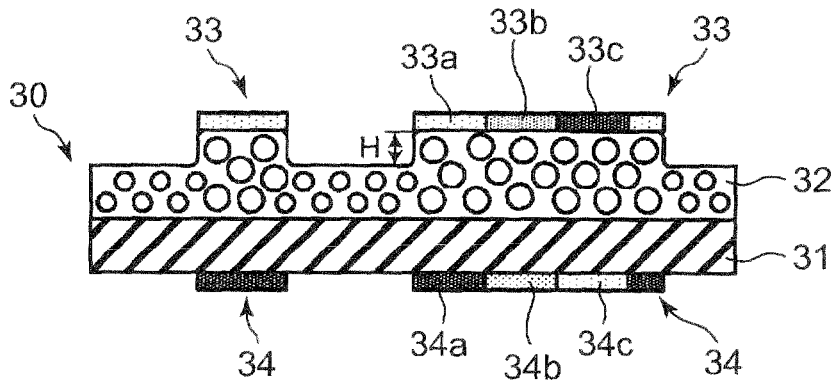

That is, when the scheduled bulge height is denoted by H, the density of the specific portion 34a is set in consideration of thermal energy generated in the region 33a of the colored image 33 formed on the surface by the irradiation of light LT performed from the back of the thermally expandable sheet 30 as shown in FIG. 7C so that the total amount of the thermal energy and the thermal energy generated in the specific portion 34a of the mirror image 34 formed on the back so as to correspond to the region 33a becomes an amount capable of expanding a region of the thermally expandable layer 32, which corresponds to the region 33a and the specific portion 34a, to the scheduled bulge height H. The densities of the specific portions 34b and 34c are also set in consideration of the thermal energy generated in the respective regions 33b and 33c of the colored image 33 formed on the surface so that a region of the thermally expandable layer 32 corresponding to the portion 34b and the specific portion 34c can expand to the scheduled bulge height H.

Further, as shown in FIG. 7C, the thermally expandable sheet 30 is uniformly irradiated with light LT, which has a predetermined intensity, from the back, so that thermal energy is generated in the colored image 33 and the mirror image 34. As a result, the regions of the thermally expandable layer 32 corresponding to the colored image 33 and the mirror image 34 are expanded (foamed). At this time, since the densities of the respective specific portions 34a to 34c of the mirror image 34 are set on the basis of the densities set in the respective regions 33a to 33c of the colored image 33, substantially uniform thermal energy is transferred to the region of the thermally expandable layer 32 corresponding to the colored image 33, so that the microcapsules are uniformly expanded as shown in FIG. 7C. Accordingly, it is possible to form a good three-dimensional image where the thermally expandable layer expands to the uniform in and scheduled intended bulge height H.

Meanwhile, the method of forming a three-dimensional image, which can expand the thermally expandable layer to the uniform and intended bulge height H even when regions having different densities are set according to patterns or the like of a colored image such as a color image, has been described in this embodiment. However, the invention is not limited thereto. That is, even when a three-dimensional image where regions having different densities are set according to patterns or the like of a colored image such as a color image and the respective regions bulge to different heights is formed, it is possible to form a good three-dimensional image where the respective regions of the colored image bulge to scheduled intended bulge heights, by adjusting the densities of the respective specific portions of the mirror image on the basis of the same technical idea as the technical idea of the above-mentioned embodiment and the bulge heights and densities of the respective regions and generating thermal energy corresponding to the bulge heights from the colored image and the mirror image thereof.

<Apparatus for Forming Three-Dimensional Image>

Next, an apparatus for forming a three-dimensional image, which can realize the above-mentioned method of forming a three-dimensional image, will be described.

Figure 8A:
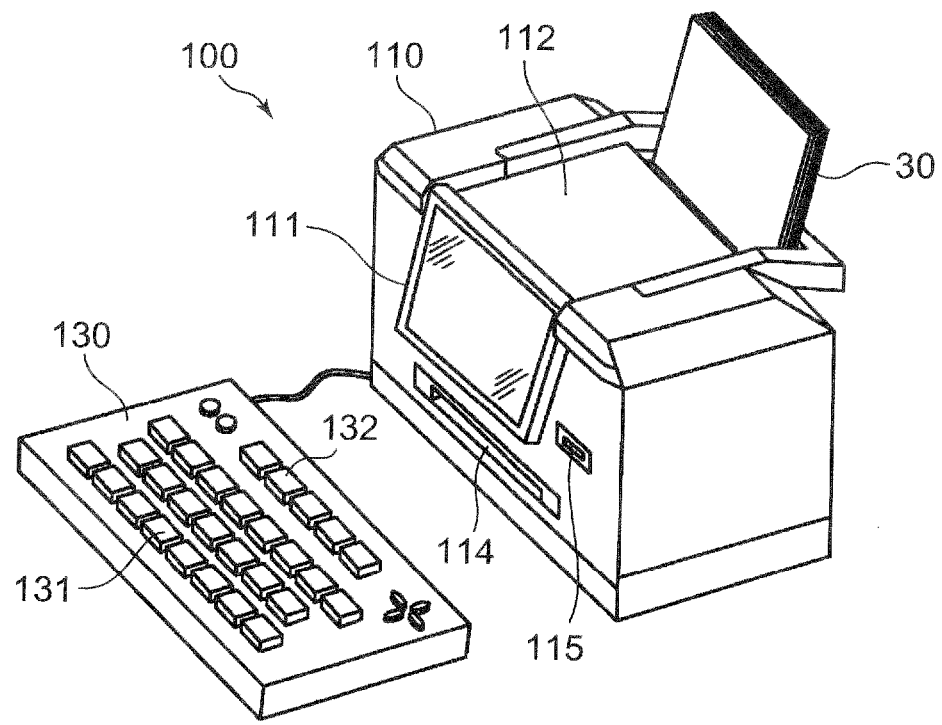
FIGS. 8A and 8B are schematic views showing an example of a printer that is applied to an apparatus for forming a three-dimensional image according to the invention.
Figure 8B:
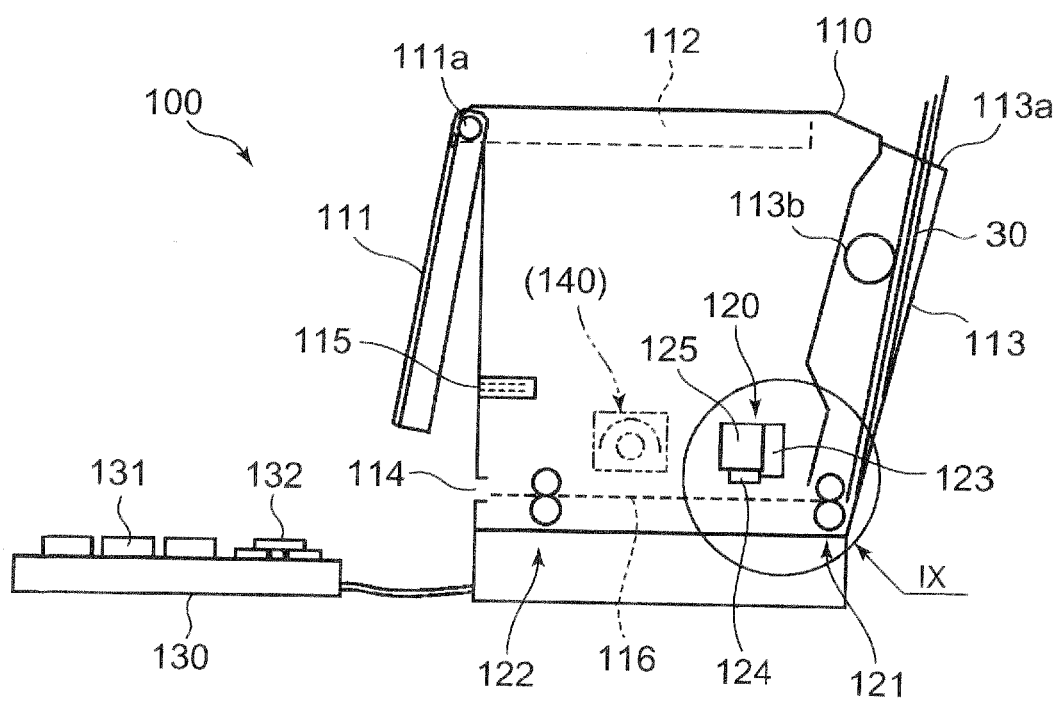
Figure 9:
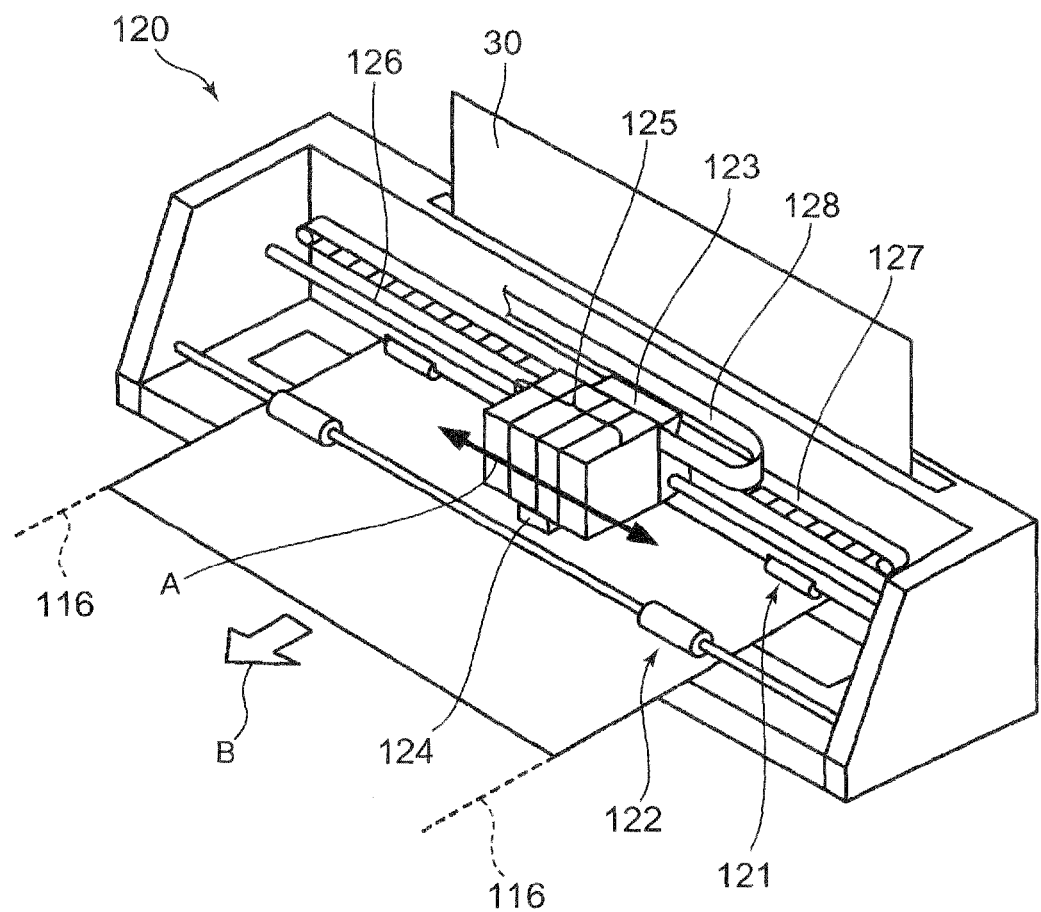
FIG. 9 is a schematic view showing an example of a printing mechanism of the printer applied to an embodiment of the invention.

FIGS. 8A and 8B are schematic views showing an example of a printer that is applied to an apparatus for forming a three-dimensional image according to the invention. FIG. 8A is a perspective view showing the schematic structure of the printer applied to this embodiment, and FIG. 8B is a cross-sectional view showing the schematic structure of the printer applied to this embodiment. FIG. 9 is a schematic view showing an example of a printing mechanism of the printer applied to this embodiment. Here, FIG. 9 is a detailed perspective view of a portion IX shown in FIG. 8B (in this specification, "IX" is used as a reference numeral corresponding to a roman numeral "9" shown in FIG. 8 for convenience).

At least the image data generation processing (S101), the back image data generation processing (S102), and the back image formation processing (S103) of the above-mentioned method of forming a three-dimensional image can be performed by a printer 100 shown in FIG. 8. The printer 100 applied to this embodiment is an inkjet printer having a function of, for example, a word processor. Specifically, the printer 100 includes a printer body 110 and a keyboard 130 as shown in FIGS. 8A and 8B.

Figure 10:
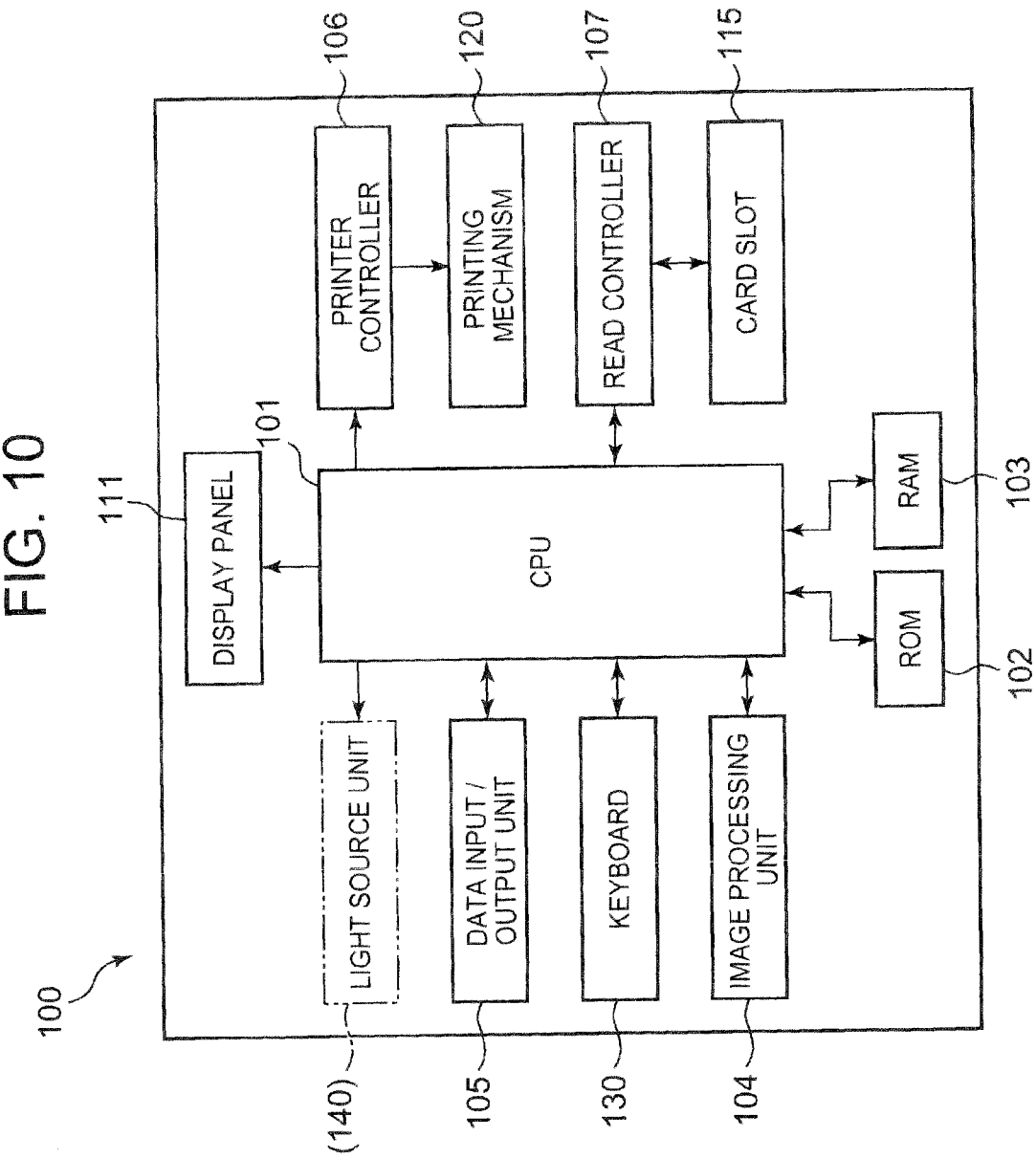
FIG. 10 is a functional block diagram of an example of the printer applied to the embodiment of the invention.

As shown in, for example, FIGS. 8A and 8B, the printer body 110 mainly includes a box-shaped housing, a display panel 111, a display panel receiving portion 112, a sheet feed tray 113, a sheet discharge port 114, a card slot 115, a printing mechanism (see FIG. 9) 120, and a control section (not shown; see FIG. 10).

The display panel 111 is formed of, for example, a liquid crystal display panel, and is mounted so as to be rotated relative to the printer body 110 about a hinge portion 111a that is provided on one side. Data input from the keyboard 130, a menu screen required for various settings, various images such as photographic images provided through a memory card, and data required for the printer are displayed on the display panel 111. The display panel receiving portion 112 is provided at the upper surface portion (on the upper surface of FIG. 8) of the printer body 110. When the printer 100 is not used, the display panel 111 is rotated and received in the display panel receiving portion 112.

The sheet feed tray 113 is provided on the rear portion (the right side in FIG. 8B) of the printer body 110. The thermally expandable sheets 30, which have been described in the above-mentioned embodiment, are received one by one in the sheet feed tray 113 from an opening portion 113a formed at the upper portion of the sheet feed tray 113, or received in the sheet feed tray 113 from an opening portion 113a while a plurality of thermally expandable sheets 30 overlap each other. A pick-up roller 113b is provided in the sheet feed tray 113. The pick-up roller 113b feeds the thermally expandable sheets 30, which are received in the sheet feed tray 113 while overlapping each other, to the printing mechanism 120, which is provided in the printer body 110, one by one.

The sheet discharge port 114 is formed at the lower portion of the front surface (the left side in FIG. 8B) of the printer body 110. The thermally expandable sheet 30, which is printed by the printing mechanism 120 provided in the printer body 110, is discharged to the outside through the sheet discharge port 114. The card slot 115 is formed at the front surface of the printer body 110. When a memory card (not shown) is inserted into the card slot 115, image data or the like are read or written.

Further, as shown in FIG. 8B, a sheet conveying path 116 along which the thermally expandable sheet 30 fed by the pick-up roller 113b provided in the sheet feed tray 113 is conveyed and guided is provided in the printer body 110. For example, an inkjet printing mechanism 120 is provided on the sheet conveying path 116. A pair of sheet feed rollers 121 and a pair of sheet discharge rollers 122, which convey the thermally expandable sheet 30, are disposed on the sheet feed side (the right side in FIG. 8B) and the sheet discharge side (the left side in FIG. 8B) of the printing mechanism 120, respectively.

As shown in FIG. 9, the printing mechanism 120 includes a carriage 123 that reciprocates in the direction of an arrow A orthogonal to the sheet conveying path 116. A printing head 124, which performs printing, and an ink cartridge 125 are mounted on the carriage 123. The ink cartridge 125 is formed of individual cartridges that store color inks, such as yellow, magenta, cyan, and black inks, or is formed of a single cartridge in which ink chambers for the respective colors are formed. The printing head 124, which includes nozzles for discharging the respective color inks, is connected to the respective cartridges or the respective ink chambers. Here, in this embodiment, a material having a high photothermal conversion property such as carbon black is applied as a black ink stored in the ink cartridge 125.

Further, the carriage 123 is supported by a guide rail 126 so as to reciprocate as described above. When a driving belt 127, which is provided parallel to the extending direction of the guide rail 126, is driven, the printing head 124 and the ink, cartridge 125 mounted on the carriage 123 reciprocate in the same direction as the carriage 123, that is, in the direction of the arrow A orthogonal to the sheet conveying path 116.

Print data or a control signal is sent to the printing head 124 from the control section, which is provided in the printer body 110, through a flexible cable 128. Here, the thermally expandable sheet 30 is intermittently conveyed in the direction of an arrow B of FIG. 9 by the pair of sheet feed rollers 121 and the pair of sheet discharge rollers 122 as described above. Furthermore, during the stop of the intermittent conveyance of the thermally expandable sheet 30, the printing head 124 ejects ink droplets when being close to the thermally expandable sheet 30 while the printing head 124 reciprocates so as to correspond to the drive of the driving belt 127. In this way, the printing head 124 prints an image, which corresponds to the print data, on the surface or the back of the thermally expandable sheet 30. An intended image (a colored image or a mirror image) is formed (printed) on the entire surface of the thermally expandable sheet 30 by the repetition of the intermittent conveyance of the thermally expandable sheet 30 and the printing of the printing head 124 during the reciprocation of the printing head 124. The thermally expandable sheet 30 on which a predetermined image has been printed by the printing mechanism 120 is discharged to the outside of the printer body 110 from the sheet discharge port 114 that is positioned on the sheet discharge side of the sheet conveying path 116 as shown in FIGS. 8A and 8B.

Moreover, as shown in FIGS. 8A and 8B, the keyboard 130 is disposed on the near side in front of the printer body 110 (on the left side in FIGS. 8A and 8B). The keyboard 130 is provided with data input keys 131, function keys 132, and the like that are necessary to perform various functions, such as the input, the editing, the printing, or the like of document data when the printer body 110 is used as a word processor.

Next, the control section provided in the printer body 110 of the above-mentioned printer 100 will be described.

FIG. 10 is a functional block diagram of an example of the printer applied to this embodiment.

As shown in FIG. 10, the above-mentioned printer 100 mainly includes a central processing circuit (hereinafter, abbreviated to a "CPU") 101, a read-only memory (hereinafter, abbreviated to a "ROM") 102 that is connected to the CPU 101, a random access memory (hereinafter, abbreviated to a "RAM") 103, an image processing unit 104, a data input/output unit 105, a printer controller 106, a read controller 107, the above-mentioned display panel 111, and the above-mentioned keyboard 130. Here, the CPU 101, the ROM 102, the RAM 103, the image processing unit 104, the data input/output unit 105, the printer controller 106, and the read controller 107 correspond to the control section of the printer 100 applied to this embodiment.

The ROM 102 stores a system program related with the control of the operation of the printer 100. The CPU 101 controls the operation of each unit of the printer 100 by sending command signals to other functional blocks, which are connected to the CPU 101, according to this system program. Further, the RAM 103 temporarily stores various data, numerical values, and the like that are generated by the CPU 101 and the like during the control of the operation of the printer.

The image processing unit 104 performs the image data generation processing (S101) of the above-mentioned method of forming a three-dimensional image. That is, image data (back image data) of a mirror image that is to be an inverted image of a colored image are generated on the basis of the image data (surface image data) of a colored image that is to be a target of a three-dimensional image input from the outside of the printer body 110 through the card slot 115 and the like and displayed on the display panel 111 or stored in the RAM 103 and the like. At this time, on the basis of the density data of a black component that are set in a specific region or pixels such as a pattern or the like of the colored image and bulge height (foam height) data that are scheduled in the specific region or the like when a three-dimensional image is formed, the density of a black component of a specific portion of a mirror image corresponding to the specific region or the like is set by the data processing method of the above-mentioned method of forming a three-dimensional image. In this way, the image processing unit 104 has a function of adjusting the density of a colored image that is formed on a thermally expandable sheet or a mirror image of the colored image.

The data input/output unit 105 inputs and outputs print commands, which are related with the image data, between the printer and an external communication device (not shown), such as a notebook personal computer or a desktop personal computer. The printer controller 106 is connected to the printing mechanism 120, and controls the discharge of the ink of the printing head 124 on the basis of the data of an image that is to be a target to be printed. Further, the printer controller 106 controls the conveyance of the thermally expandable sheet 30 to the sheet discharge side by controlling the reciprocation of the carriage 123 on which the printing head 124 is mounted and the drive of the pair of sheet feed rollers 121 and the pair of sheet discharge rollers 122. The read controller 107 is connected to the card slot 115, reads image data from a memory card (not shown) inserted into the card slot 115, and sends the image data to the CPU 101 or the image processing unit 104.

According to the printer 100 having the above-mentioned configuration, it is possible to form an image (a colored image or a mirror image), which has a predetermined density corresponding to the image data, on the surface or the back of the thermally expandable sheet 30 that is fed from the sheet feed tray 113. Meanwhile, a case where the printer 100 has a function of printing an image only on one surface of a sheet has been described in this embodiment. That is, in the surface image formation processing (S102) of the above-mentioned method of forming a three-dimensional image, the thermally expandable sheet 30 is fed so that the surface of the thermally expandable sheet 30 faces the printing head 124. Accordingly, an intended colored image is printed on the surface of the thermally expandable sheet 30. Moreover, in the back image formation processing (S103), the thermally expandable sheet 30 is turned upside down and is fed so that the back of the thermally expandable sheet 30 faces the printing head 124. Accordingly, a mirror image corresponding to the colored image formed on the surface of the thermally expandable sheet 30 is printed on the back thereof.

The printer applied to the apparatus for forming a three-dimensional image according to the invention is not limited thereto, and may be provided with sheet reversing mechanisms for double-sided printing on the sheet feed side and the sheet discharge side of the printing mechanism 120 of the printer body 110 as shown in FIGS. 8B and 9. That is, in the printing mechanism 120, the thermally expandable sheet 30 on which printing has been completed on the surface (or the back) and which is conveyed to the sheet discharge side may be conveyed in the direction opposite to the arrow B and then return to the sheet feed side. The thermally expandable sheet 30 may be reversed and turned upside down on the sheet feed side, printing may be performed on the back (or the surface) of the thermally expandable sheet 30, and the thermally expandable sheet 30 may be discharged from the sheet discharge port 114. According to this, it is possible to omit a work for turning the thermally expandable sheet 30, which is discharged after being subjected to printing on one surface thereof, upside down and receiving the thermally expandable sheet 30 in the sheet feed tray 113 again.

Further, a case where the image data generation processing (S101) of the method of forming a three-dimensional image according to this embodiment is performed by the image processing unit 104 provided in the control section of the printer 100 has been described in the above-mentioned embodiment. However, the invention is not limited thereto. That is, the above-mentioned image data generation processing may be performed in an external communication device such as a personal computer connected to the printer 100 through the data input/output unit 105, the image data (back image data) of a mirror image or the density data thereof may be sent to the printer 100, and the mirror image of the colored image may be formed (printed) on the back of the thermally expandable sheet 30 so as to have a predetermined density.

Furthermore, a case where the image data generation processing (S101), the surface image formation processing (S102), and the back image formation processing (S103) of the method of forming a three-dimensional image according to this embodiment are performed by the printer 100 has been described in the above-mentioned embodiment. However, the invention is not limited thereto. That is, for example, as shown by a two-dot chain line in FIG. 8B, a light source unit 140 such as a halogen lamp may be disposed on the upper surface side or the lower surface side of the sheet conveying path 116 (or the thermally expandable sheet 30) on the sheet discharge side of the printing mechanism 120. Here, for example, as shown by a two-dot chain line in FIG. 10, the light source unit 140 emits light, which has a predetermined intensity, on the basis of a command from the CPU 101 according to the conveyance of the thermally expandable sheet 30.

In this configuration, the thermally expandable sheet 30 where a predetermined colored image and a predetermined mirror image have been formed on the surface and the back through the image data generation processing (S101), the surface image formation processing (S102), and the back image formation processing (S103) is irradiated with uniform light from the back thereof, thereby performing the light irradiation/heating processing (S104) for forming a three-dimensional image by expanding the thermally expandable layer 32 of the thermally expandable sheet 30 so that the thermally expandable layer 32 bulges to a predetermined bulge height. That is, in a single printer 100, it is possible to collectively perform all the processes of the above-mentioned method of forming a three-dimensional image.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

The invention claimed is:

1. A method of forming a three-dimensional image, the method comprising:
    forming a first print image on a first surface of a thermally expandable sheet which includes a thermally expandable layer formed on one surface of a base sheet;
    forming a second print image on a region of a second surface of the thermally expandable sheet, wherein the second print image is a mirror image of the first print image, wherein the region of the second surface corresponds to the first print image of the first surface, and wherein a density of a light absorbing photothermal conversion material contained in the second print image is set based on a density of a color image photothermal conversion material contained in the first print image; and
    forming a three-dimensional image of the first print image by selectively expanding the thermally expandable layer with a thermal energy that is generated in both the first print image and the second print image when irradiating the thermally expandable sheet with light from the second surface of the thermally expandable sheet, wherein the thermal energy generated in the first print image and the second print image is dependent upon the density of the color image photothermal conversion material contained in the first print image and the density of the light absorbing photothermal conversion material contained in the second print image, respectively,
    wherein the second print image is formed with a first density of the light absorbing photothermal conversion material at a first part of the second print image and with a second density of the light absorbing photothermal conversion material at a second part of the second print image,
    wherein the first density of the light absorbing photothermal conversion material of the second print image is lower than the second density of the light absorbing photothermal conversion material of the second print image,
    wherein the first part of the second print image corresponds to a first part of the first print image, and the second part of the second print image corresponds to a second part of the first print image, wherein a first density of the color image photothermal conversion material of the first part of the first print image is higher than a second density of the color image photothermal conversion material of the second part of the first print image, and
    wherein the three-dimensional image of the first print image is formed by uniformly irradiating the thermally expandable sheet with the light so that the thermally expandable sheet corresponding to the first part of the first print image expands to a same bulge height as the thermally expandable sheet corresponding to the second part of the first print image.

2. The method according to claim 1, wherein the three-dimensional image of the first print image is formed by selectively expanding the thermally expandable layer with the thermal energy that is generated by the light that is radiated to the thermally expandable sheet according to the density of the color image photothermal conversion material contained in the first print image and the density of the light absorbing photothermal conversion material contained in the second print image.

3. The method according to claim 2, wherein the density of the light absorbing photothermal conversion material contained in the second print image is set in consideration of the thermal energy, which is generated according to the density of the color image photothermal conversion material contained in the first print image, so that the thermally expandable layer expands to achieve a preset predetermined bulge height.

4. The method according to claim 3, wherein the first print image is a colored image and includes regions that have different densities of the color image photothermal conversion material, and
    wherein the second print image includes specific portions where densities of the light absorbing photothermal conversion material are set so as to correspond to the regions having the different densities of the first print image.

5. The method according to claim 4, wherein the light includes infrared wavelengths.

6. The method according to claim 2, wherein the density of the light absorbing photothermal conversion material contained in the second print image is set to be inversely proportional to the density of the color image photothermal conversion material contained in the first print image, so that the thermally expandable layer expands to achieve a preset predetermined bulge height.

7. The method according to claim 3, wherein the light includes infrared wavelengths.

8. The method according to claim 1, wherein the density of the light absorbing photothermal conversion material contained in the second print image is set in consideration of the thermal energy, which is generated according to the density of the color image photothermal conversion material contained in the first print image, so that the thermally expandable layer expands to achieve a preset predetermined bulge height.

9. The method according to claim 8, wherein the first print image is a colored image and includes regions that have different densities of the color image photothermal conversion material, and
    wherein the second print image includes specific portions where densities of the light absorbing photothermal conversion material are set so as to correspond to the regions having the different densities of the first print image.

10. The method according to claim 8, wherein the light includes infrared wavelengths.

11. The method according to claim 1, wherein the first print image is a colored image and includes regions that have different densities of the color image photothermal conversion material, and wherein the second print image includes specific portions where densities of the light absorbing photothermal conversion material are set so as to correspond to the regions having the different densities of the first print image.

12. The method according to claim 11, wherein the light includes infrared wavelengths.

13. The method according to claim 1, wherein the density of the light absorbing photothermal conversion material contained in the second print image is set to be inversely proportional to the density of the color image photothermal conversion material contained in the first print image, so that the thermally expandable layer expands to achieve a preset predetermined bulge height.

* * * * *